(12) United States Patent
Chien

(10) Patent No.: US 12,469,439 B2
(45) Date of Patent: Nov. 11, 2025

(54) GATE DRIVER CIRCUIT AND DISPLAY DEVICE

(71) Applicant: NOVATEK Microelectronics Corp., Hsinchu (TW)

(72) Inventor: Tso-Hua Chien, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/939,357

(22) Filed: Nov. 6, 2024

(65) Prior Publication Data

US 2025/0308435 A1    Oct. 2, 2025

(30) Foreign Application Priority Data

Mar. 28, 2024   (TW) .................................. 113111843

(51) Int. Cl.
*G09G 3/32* (2016.01)
*G11C 19/28* (2006.01)

(52) U.S. Cl.
CPC ............. *G09G 3/32* (2013.01); *G11C 19/287* (2013.01); *G09G 2300/0857* (2013.01); *G09G 2310/0286* (2013.01); *G09G 2310/08* (2013.01); *G09G 2340/0435* (2013.01)

(58) Field of Classification Search
CPC ............. G09G 3/32; G09G 2310/0286; G09G 2310/08; G09G 2340/0435; G09G 2300/0857; G11C 19/287
See application file for complete search history.

(56) References Cited

U.S. PATENT DOCUMENTS

| 2018/0240427 A1* | 8/2018 | Xi | .......................... G11C 19/38 |
| 2020/0258467 A1* | 8/2020 | Lin | ....................... G11C 19/287 |
| 2022/0277685 A1* | 9/2022 | Chien | ................... G09G 3/2096 |

FOREIGN PATENT DOCUMENTS

| CN | 1794331 A | 6/2006 |
| CN | 102103823 A | 6/2011 |
| TW | 201643855 A | 12/2016 |

* cited by examiner

*Primary Examiner* — Muhammad N Edun
(74) *Attorney, Agent, or Firm* — CKC & Partners Co., LLC

(57) ABSTRACT

A gate driver circuit includes multiple stages of shift registers. These shift registers are cascade connected in series. Each stage of the shift registers includes a scan unit, a control unit and an output unit. The scan unit receives an enable signal. The scan unit is triggered by a clock signal to sample the enable signal, so as to generate a first node voltage. The first node voltage is utilized as a shift output signal transmitted to a subsequent shift register. The control unit receives a multiple-area-frame-rate control signal. According to the multiple-area-frame-rate control signal, the control unit selectively blocks the first node voltage and outputs the second node voltage. The output unit selectively transmits or suspends transmitting gate driver signals to a pixel circuit on a display panel according to the second node voltage.

20 Claims, 10 Drawing Sheets

GATE DRIVER CIRCUIT AND DISPLAY DEVICE

CROSS-REFERENCE TO RELATED APPLICATION

This application claims priority to Taiwan Application Serial Number 113111843, filed Mar. 28, 2024, which is herein incorporated by reference in its entirety.

BACKGROUND

Field of Invention

The disclosure relates to a gate driver circuit applied to a display panel. More particularly, the disclosure relates to a gate driver circuit with multiple-area-frame-rate control.

Description of Related Art

As the display technology developed, display panel has been widely applied to a variety of electronic devices. For example, display panel has been applied to televisions, computers, cell-phones, and wearable devices. With the progress of the display technology, various technologies have been developed, such as the Gate on Array (GOA) technique, which integrates the gate driver circuit into the display array. The GOA technique help decrease the number of pins of the array substrate that exterior driver circuits are connected, achieving a narrow bezel design requirement. Take the dynamic frame-rate control technique for another example, the technique is able to mediate the refresh rate according to the content that displays or the power status of the device.

SUMMARY

The disclosure provides a gate driver circuit which includes plurality stages of shift registers. These shift registers are cascade connected in series. Each stage of the shift registers includes a scan unit, a control unit and an output unit. The scan unit is configured to receive an enable signal, the scan unit samples the enable signal according to a clock to output a first node voltage, and the first node voltage is output to a rear-stage shift register as a shift output signal. The control unit is configured to receive a multiple-area-frame-rate control signal. The control unit is configured to output a second node voltage according to the first node voltage when the multiple-area-frame-rate control signal is at a first-level. The control unit is configured to insulate the first node voltage causing the second node voltage remain unchanged when the multiple-area-frame-rate control signal is at a second-level. The output unit is configured to receive the second node voltage. The output unit selectively transmits or suspends transmitting a plurality of gate driver signals to a pixel circuit on the display panel according to the second node voltage.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
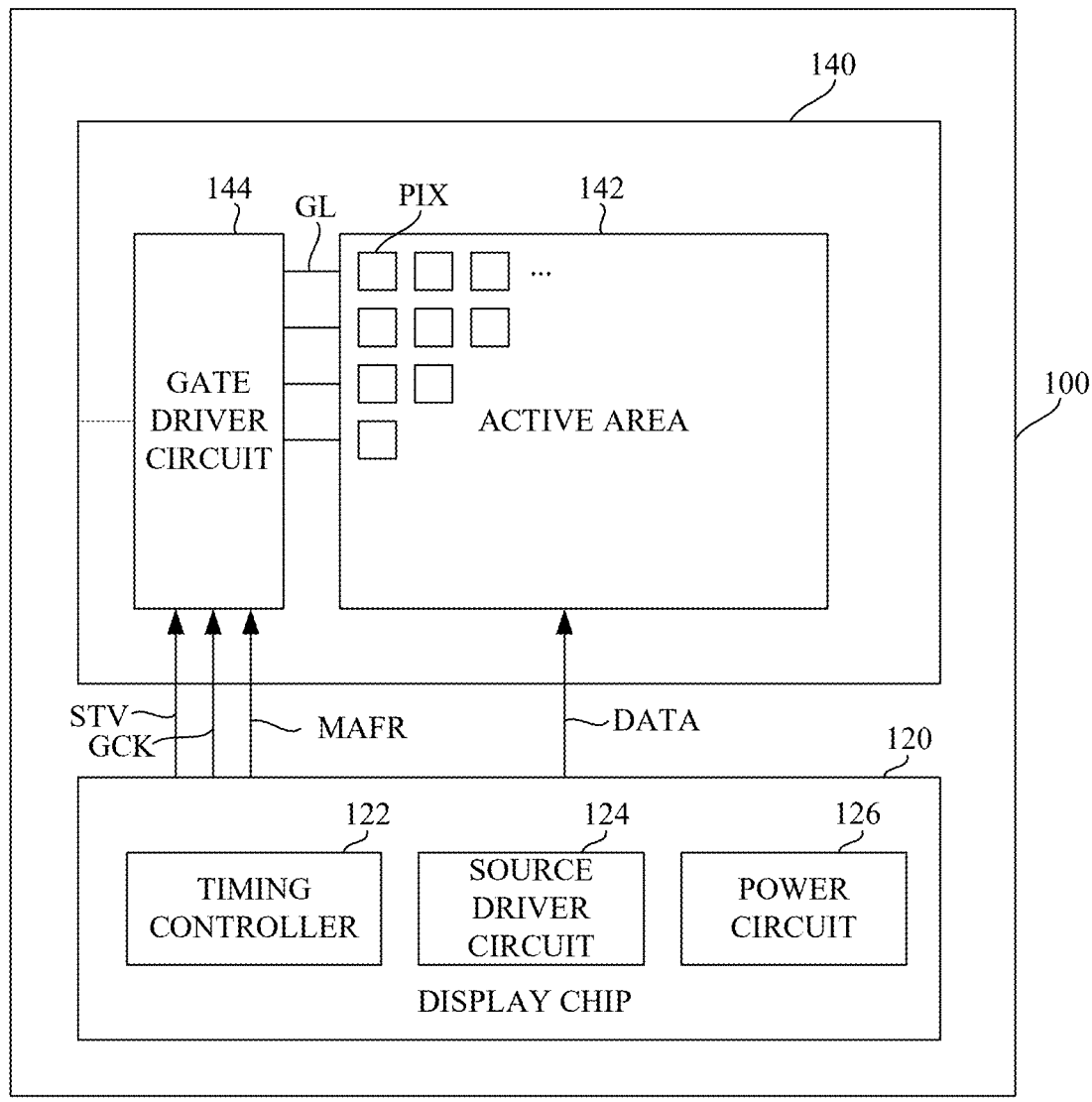
FIG. 1 is a schematic diagram illustrating a display device according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a display device 100 according to an embodiment of the disclosure. The display device 100 includes a display chip 230 and a display panel 140 as shown in FIG. 1. In an embodiment of the disclosure, display chip 120 is configured to provide the data signal DATA relating to the display content and scan control signals (For example, a scan activating signal STV, a clock signal GCK, and a multiple-area-frame-rate control signal MAFR) to the display panel 140. In some embodiments, the display chip 120 can include a timing controller 122, a source driver circuit 124, and a power circuit 126. The timing controller 122 can be configured to produce the scan activating signal STV, a clock signal GCK, and a multiple-area-frame-rate control signal. The source driver circuit 124 is configured to produce the data signal DATA of the display content. The power circuit 126 is configured to produce a system voltage.

As shown in FIG. 1, the display panel 140 includes an active area 142 and a gate driver circuit 144. In the embodiment shown in FIG. 1, the gate driver circuit 144 is the Gate-on-Array (GOA) gate driver circuit integrated to the display array substrate. The gate driver circuit 144 is configured to generate gate driver signals according to the scan control signal (including the scan activating signal STV, a clock signal GCK, and a multiple-area-frame-rate control signal MAFR) provided by the display chip 120, and transmits the gate driver signals to the active area 142 by gate driver line GL.

Figure 2:
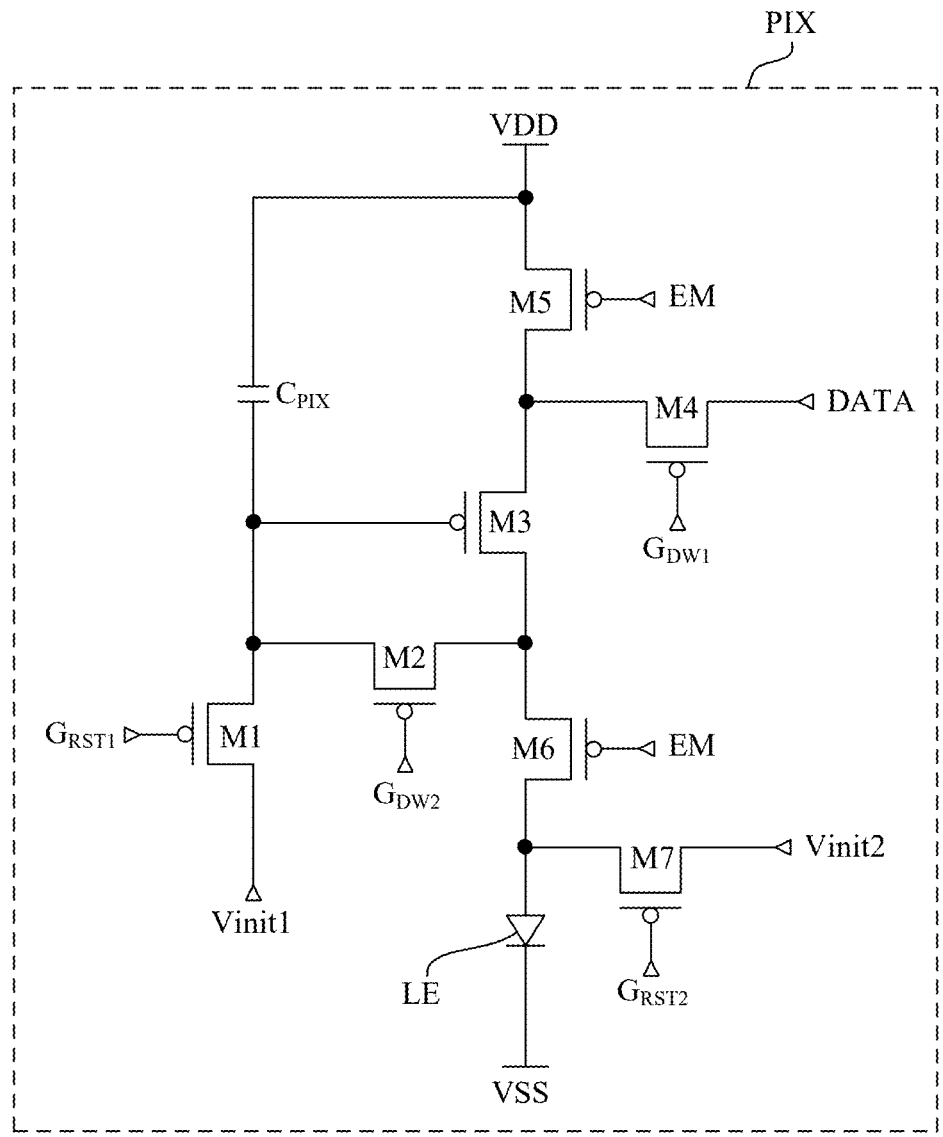
FIG. 2 is a schematic diagram illustrating an interior structure according to one of the pixel circuits of the disclosure.

The active area 142 includes a plurality of pixel circuits PIX. These pixel circuits PIX individually display the corresponding image contents according to the corresponding gate driver circuit signals. Referring to FIG. 2, FIG. 2 illustrates an interior structure schematic diagram of one of the pixel circuits PIX of present disclosure.

In the embodiment shown in FIG. 2, the pixel circuits PIX includes seven transistor switches M1~M7, a pixel capacitor CPIX, and a luminous element LE. As illustrated in FIG. 2, the transistor switches M5, M3, and M6 are arranged in between systematic high-voltage VDD and systematic low-voltage VSS, that is, on the illuminating path of luminous element LE. The transistor switch M3 is configured to control the driving current magnitude of the luminous element LE. The transistor switches M5 and M6 are configured to control the point of time and the length of time where the luminous element LE illuminates. The transistor switch M1 resets the gate voltage of the transistor switch M3 with an initializing voltage Vinit1 according to controlling of the gate driver signal GRST1. The transistor switch M7 resets the anode voltage of the luminous element LE with an initializing voltage Vinit2 according to controlling of the gate driver signal GRST2. The transistor switch M4 controls the write operation of the data signal DATA according to the gate driver signal GDW1. The transistor switch M2 controls the compensate operation of the data signal DATA to the gate voltage of the transistor switch M3 according to the gate driver signal GDW2.

In the embodiment shown in FIG. 2, the transistor switches M1, M7, M4, and M2 are individually controlled by the corresponding gate driver signals GRST1, GRST2, GDW1 and GDW2 to turn on or off at a proper point of time respectively.

In the embodiment of the disclosure, these gate driver signals GRST1, GRST2, GDW1 and GDW2 are generated by the gate driver circuit 144, then provided to the pixel circuits PIX through the gate driver line GL. The refreshing and switching frequencies of these gate driver signals GRST1, GRST2, GDW1 and GDW2 are related to the display frame rate. The higher the display frame rate, the more frequent the gate driver signals GRSt1, GRST2, GDW1 and GDW2 change. The lower the display frame rate, the longer the time spanned between the changes of the gate driver signals GRST1, GRST2, GDW1 and GDW2.

The frame rate of the display device can be dynamically mediated if the full-area-frame-rate control technique is applied. However, if a part of the area has a moving object while the other part is at rest, lowering the overall frame rate will let the picture of the moving object refresh intermittently, causing a motion blur issue. On the contrary, raising the overall frame rate will produce an unnecessary switching energy cost of the resting area.

The multiple-area-frame-rate control technique is an advanced technology applied to the display device, by dividing the screen into multiple areas, the frame rate or refresh rate is intentionally adjusted in each area according to the display contents. The display device is able to process the moving contents of different areas effectively by means of this individual frame-rate control, enhancing the fluency and clarity of the overall screen. The multiple-area-frame-rate control technique helps decrease the occurrence of the motion blur and the screen tearing situations, offering a premium visual experience. In the meantime, the technique also promotes energy conservation because the area refresh rate is adjusted only when needed.

In order to achieve the multiple-area-frame-rate control technique, providing different gate driver signals to designated areas is necessary. For example, a low motion area requires a 1 frame per minute (fpm) gate driver signal, and a high motion area requires a 60 or a 120 fpm gate driver signal. If a general cascade connection is applied to the gate driver circuit, each level of the gate driver signal is triggered by the previous level of the signal to be generated sequentially, such that the refresh rates tailored to different respective area are hard to realize. Otherwise, in some embodiments, the different frame rates are achieved by adopting multiple gate driver circuits (such as three to four independent gate driver circuits).

Some embodiments of the present disclosure propose a circuit framework of the gate driver circuit 144, utilizing relatively less sets of gate driver circuit (such as single set) to achieve the multiple-area-frame-rate control feature.

Figure 3:
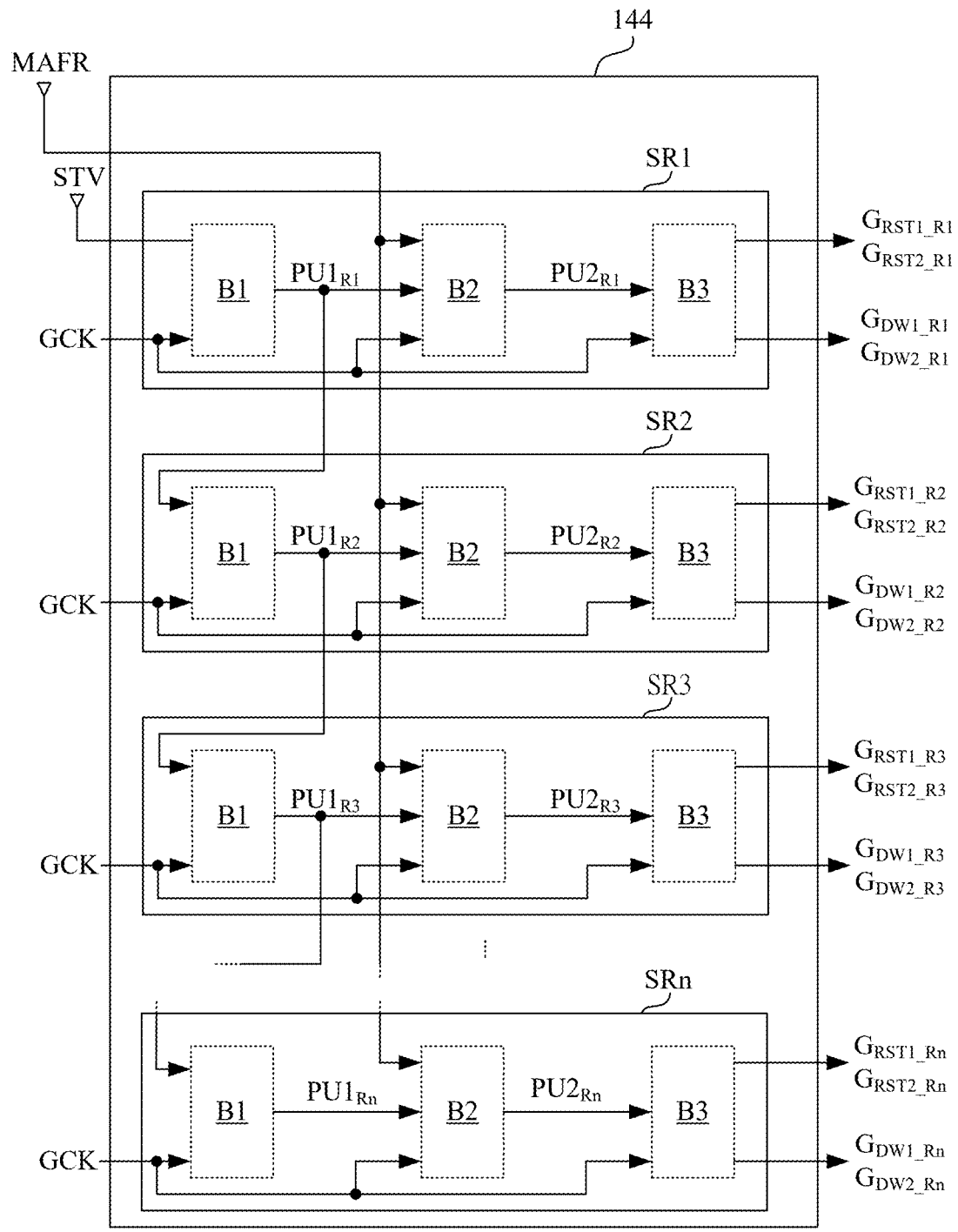
FIG. 3 is a functional block diagram illustrating the gate driver circuit according to some embodiments of FIG. 1.

Referring to FIG. 3 as well, FIG. 3 illustrates a functional block diagram of the gate driver circuit 144 in FIG. 1 in some embodiments. As shown in FIG. 3, the gate driver circuit 144 includes a plurality of shift registers SR1, SR2, SR3, . . . , SRn, and each of these shift registers are cascade connected with one another. For example, the shift register SR2 is cascade connected after the shift register SR1, the shift register SR3 is cascade connected after the shift register SR2, and so on. In this embodiment, the letter n is a positive integer, the number n can be determined corresponds to the resolution of the display panel 140 in practical application.

Each of these shift registers SR1~SRn includes a scan unit B1, a control unit B2, and an output unit B3.

Take the first-stage shift register SR1 for example, the scan unit B1 of the first-stage shift register SR1 receives an enable signal (as shown in FIG. 3, the enable signal of the first-stage shift register SR1 is the scan activating signal STV). The scan unit B1 samples the scan activating signal STV to output a first node voltage PU1R1 according to the clock signal GCK. In addition, the first node voltage PU1R1 is output as a shift output signal to a rear-stage shift register (i.e., the second-stage shift register SR2), and the enable signal that the scan unit B1 of the second-stage shift register SR2 receives is the first node voltage PU1R1 that the first-stage shift register SR1 generated. By doing so, the effect of the sequential front-rear stage transmission between these shift registers SR1~SRn can be achieved.

As shown in FIG. 3, the control unit B2 of the first-stage shift register SR1 receives the multiple-area-frame-rate control signal MAFR. The control unit B2 selects whether to insulate the first node voltage PU1R1 according the level of the multiple-area-frame-rate control signal MAFR, and correspondingly decides whether to change the second node voltage PU2R1. The output unit B3 of the first-stage shift register SR1 is configured to receive the second node voltage PU2R1, and the output unit B3 selectively transmits or suspends transmitting the gate driver signal to pixel circuits PIX of the display panel 140 according to the second node voltage PU2R1.

The output unit B3 of the first-stage shift register SR1 is configured to receive the second node voltage PU2R1, and the output unit B3 selectively transmits or suspends transmitting the gate driver signals GRST1_R1, GRST2_R1, GDW1_R1 and GDW2_R1 to the pixel circuits PIX located on the first line of the display panel 140 (configured to control the transistor switches M1, M7, M4, and M2 as shown in FIG. 2) according to the second node voltage PU2R1.

In an embodiment, when the multiple-area-frame-rate control signal MAFR is at the first level (such as low-level), the control unit B2 does not insulate the first node voltage PU1R1, and the control unit B2 causes the second node voltage PU2R1 changing according to the first node voltage PU1R1. At this moment, the output unit B3 transmits the gate driver signals GRST1_R1, GRST2_R1, GDW1_R1 and GDW2_R1 to the display panel 140 according to the changed second node voltage PU2R1 in order to refresh the screen of the pixel circuits PIX on the first line (frame changed).

On the other hand, when the multiple-area-frame-rate control signal MAFR is at the second level (such as high-level), the control unit B2 insulates the first node voltage PU1R1, and the second node voltage PU2R1 remains unchanged. At this moment, the output unit B3 suspends transmitting the gate driver signals GRST1_R1, GRST2_R1, GDW1_R1 and GDW2_R1 to the display panel 140 according to the unchanged second node voltage PU2R1 in order to suspend refreshing the screen of the pixel circuits PIX on the first line (frame unchanged).

As mentioned above, the control unit B2 of the first-stage shift register SR1 is able to generate or suspend generating the gate driver signals GRST1_R1, GRST2_R1, GDW1_R1 and GDW2_R1 based on the received multiple-area-frame-rate control signal MAFR, in order to decide whether to refresh the screen of the pixel circuits PIX on the first line.

Likewise, the respective control units B2 of the second-stage shift register SR2, the third-stage shift register SR3, and the nth-stage shift register SRn are able to control whether to insulate the first node voltages PU1R2, PU1R3, PU1Rn based on said receiving the multiple-area-frame-rate control signal MAFR, and further control whether to change the second node voltages PU2R2, PU2R3, PU2Rn so as to generate or suspend generating the gate driver signals, in order to decide whether to refresh the screen of the pixel circuits PIX on the second line to the nth line, achieving the multiple-area-frame-rate control feature.

Figure 4:
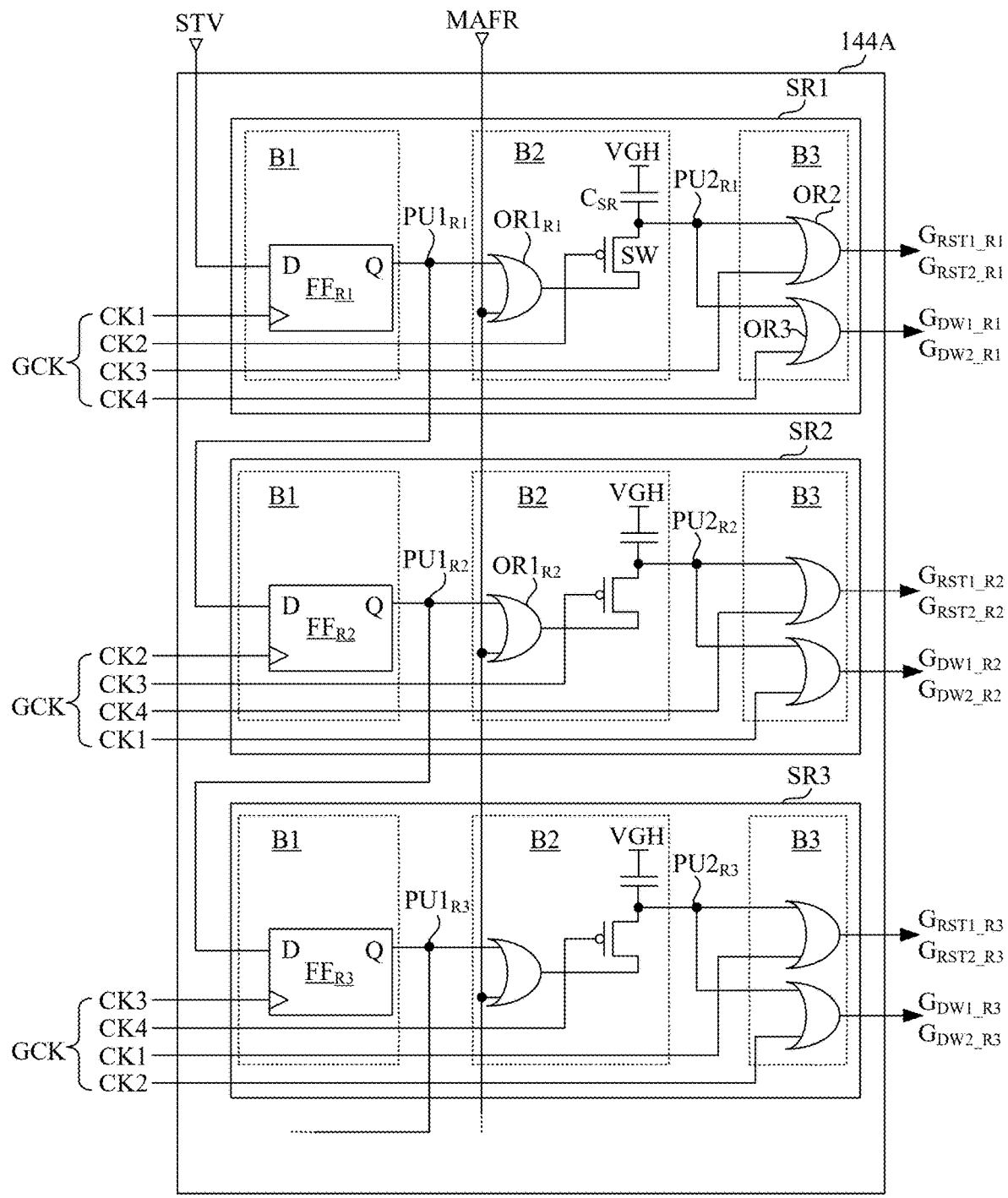
FIG. 4 is a circuit diagram illustrating an interior structure of the gate driver circuit according to one of the embodiments.
Figure 5:
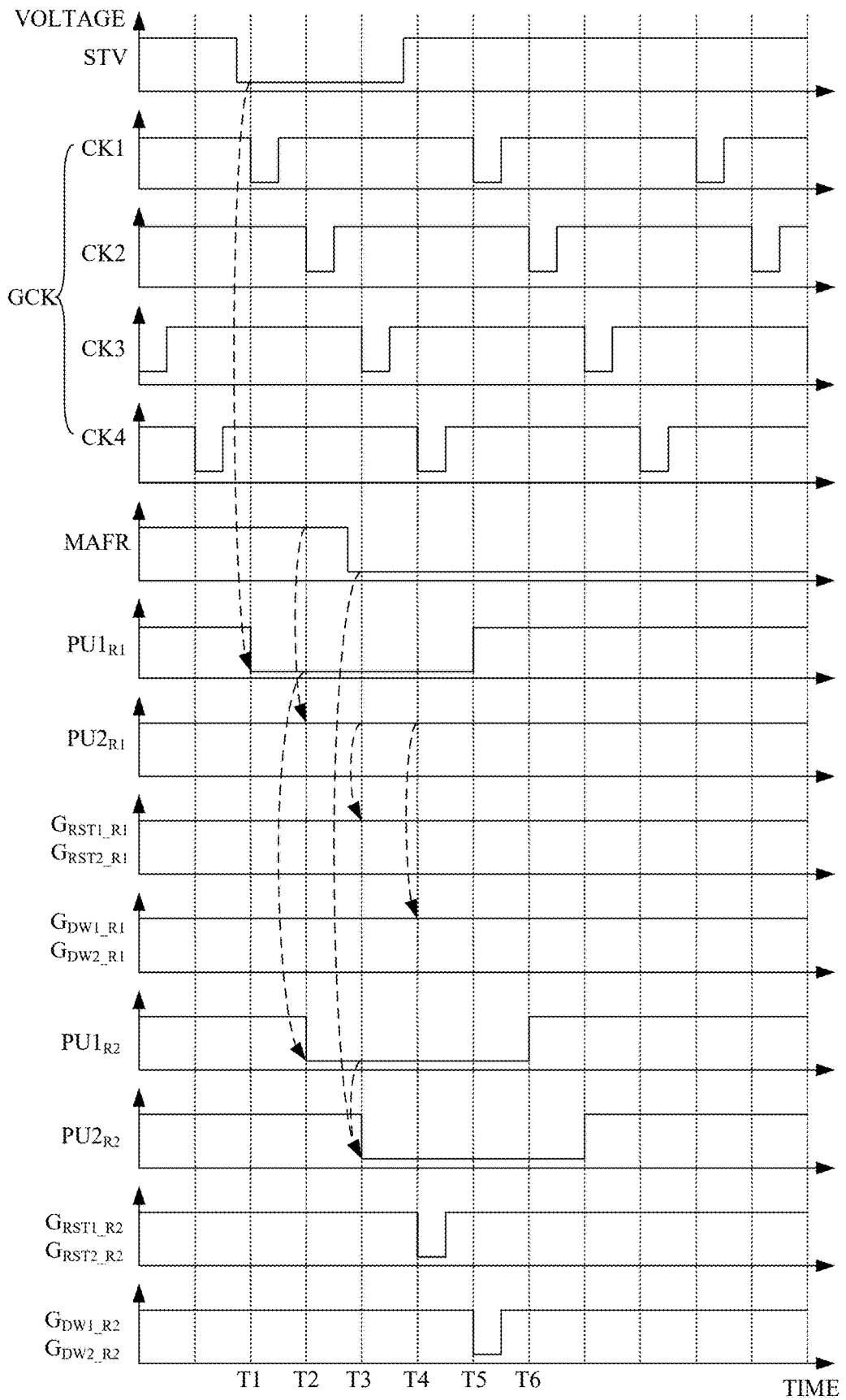
FIG. 5 is a timing waveform illustrating the signals related to the gate driver circuit change with respect to time according to the embodiment of FIG. 4.

Referring to FIG. 4 and FIG. 5 together, FIG. 4 illustrates a circuit diagram of an interior structure of a gate driver circuit 144A in one of the embodiments. FIG. 5 illustrates a timing waveform of the signal voltages, which change with respect to time, related to the gate driver circuit 144A in the embodiment of FIG. 4.

In some embodiments shown in FIG. 4 and FIG. 5, the clock signal GCK provided to the gate driver circuit 144A includes clock signals CK1, CK2, CK3, and CK4 of four phases, wherein the phase of the clock signal CK2 lags from the clock signal CK1; the phase of the clock signal CK3 lags from the clock signal CK2; the phase of the clock signal CK4 lags from the clock signal CK3; and because of the circulatory reason, the phase of the clock signal CK1 lags from the clock signal CK4 of previous cycle. In another embodiment, clock signals CK1, CK2, CK3, and CK4 of four different phases are provided by a display chip, and the clock signals CK1, CK2, CK3, and CK4 in FIG. 5 are only one of the embodiments, person having ordinary skill in the art can also select any four clock signals whose phases will not overlap at low voltage level. In another embodiment, the display chip only provides one clock signal, such as CK1, and the clock signals CK2, CK3, and CK4 are provided by a specific circuit from the gate driver circuit on the panel.

As shown in FIG. 4, the scan unit B1 of the first-stage shift register SR1 includes a first flip-flop FFR1, and a data input terminal D of the first flip-flop FFR1 receives the enable signal. Regarding the first-stage shift register SR1, the enable signal is the scan activating signal STV provided by the display chip 120 (refers to FIG. 1). A clock input terminal of the first flip-flop FFR1 receives the first clock signal CK1.

As shown in FIG. 4, the control unit B2 of the first-stage shift register SR1 includes a first OR logic gate OR1R1, a switch SW, and a capacitor CSR. Two input terminals of the first OR logic gate OR1R1 respectively receive the first node voltage PU1R1 and the multiple-area-frame-rate control signal MAFR. The first terminal of the switch SW is coupled to the output terminal of the first OR logic gate OR1R1, the gate terminal of the switch SW receives the second clock signal CK2, and the second terminal of the switch SW is configured to output the second node voltage PU2R1. The first terminal of the capacitor CSR is coupled to the second terminal of the switch SW, configured to temporary store the second node voltage. The second terminal of the switch SW is coupled to a systematic high voltage VGH.

As shown in FIG. 4, the output unit B3 of the first-stage shift register SR1 includes a second OR logic gate OR2 and a third OR logic gate OR3. Two input terminals of the second OR logic gate OR2 respectively receive the second node voltage PU2R1 and the third clock signal CK3, the output terminal of the second OR logic gate OR2 is configured to output the first gate driver signals GRST1_R1 and GRST2_R1 to the pixel circuit PIX (referring to FIG. 1 or FIG. 2). Referring to the embodiment of FIG. 2, the first gate driver signals GRST1_R1 and GRST2_R1 can be used to reset or initialize a part of the voltage nodes in the pixel circuits PIX. Two input terminals of the third OR logic gate OR3 separately receive the second node voltage PU2R1 and the fourth clock signal CK4, the output terminal of the third OR logic gate is configured to output the second gate driver signals GDW1_R1 and GDW2_R1 to the pixel circuits PIX. Referring to the embodiment of FIG. 2, the second gate driver signals GDW1_R1 and GDW2_R1 can be used to control the write operation of the data signal DATA in the pixel circuits PIX.

Similar to the first-stage shift register SR1, the scan unit B1 of the second-stage shift register includes a second flip-flop FFR2. The data D of the second flip-flop FFR2 receives the enable signal. Regarding the second-stage shift register SR2, the enable signal is the shift output signal (i.e., the first node voltage PU1R1) from the first shift register SR1, and the clock input terminal of the second flip-flop FFR2 receives the second clock signal CK2. The structure of the control unit B2 and the output unit B3 of the second-stage shift register SR2 are similar to the first-stage shift register SR1, the main difference is that the phase of the clock signal which the second-stage shift register SR2 used lags from the previous stage, and thus the similarities of circuit structure does not repeat herein.

Similar to the first-stage shift register SR1 and the second-stage shift register SR2, the third-stage shift register SR3 has the similar scan unit B1, control unit B2, and output unit B3, the main difference is the enable signal is the shift output signal from the second-stage shift register SR2 (i.e., the first node voltage PU1R2 generated by the second flip-flop FFR2) with regard to the third flip-flop FFR3 of the third-stage shift register SR3, and the phase of the clock signal which the third-stage shift register SR3 used lags from the previous stage. The subsequent stages of the shift register of the gate driver circuit 144A can be deduced similarly. FIG. 4 only shows the first three stages of shift registers for simplicity, but the disclosure is not limited to the description above.

In the embodiment shown in FIG. 4 and FIG. 5, at the time point T1, the first flip-flop FFR1 is triggered to sample the level of the scan activating signal STV according to an edge of the first clock signal CK1 (the first flip-flop FFR1 is triggered according to a falling edge of the first clock signal CK1 in this embodiment) and generate the first node voltage PU1R1 at a data output terminal Q of the first flip-flop FFR1. Because the level of the scan activating signal STV sampled at time point T1 is a low-level, the first flip-flop FFR1 switches the first node voltage PU1R1 from a high-level to the low-level. The first node voltage PU1R1 is output to the second-stage shift register SR2 as a shift output signal.

Then, at the time point T2, because the multiple-area-frame-rate control signal MAFR is at high-level, the output terminal of the first OR logic gate OR1R1 of the first-stage shift register SR1 (due to the control by the multiple-area-frame-rate control signal MAFR) will remain at high-level, that is the output terminal of the first OR logic gate OR1R1 will not change as a result of the first node voltage PU1R1 switching to low-level. Therefore, under the circumstance that the multiple-area-frame-rate control signal MAFR is at high-level, the first OR logic gate OR1R1 is able to insulate (gate) the change of the first node voltage PU1R1, and the second node voltage PU2R1 of the first shift register SR1 remains at high-level. As shown in FIG. 5, under this circumstance, at the time points T3 and T4, because the second node voltage PU2R2 remains at high-level, the first gate driver signals GRST1_R1 and GRST2_R1 will not generate a low-level pulse along with the third clock signal CK3, the second gate driver signals GDW1_R1 and GDW2_R1 will not generate a low-level pulse along with the fourth clock signal CK4, and thus the pixel circuits PIX on the first line will suspend refreshing, achieving the effect of lowering the frame rate.

Besides, at the time point T2, the second flip-flop FFR2 of the second-stage shift register SR2 is triggered to sample the level of the enable signal according to the falling edge of the second clock signal CK2 and generate the first node voltage PU1R1 at the data output terminal Q of the first flip-flop FFR1. Because the scan activating signal STV sampled at the time point T1 is at low-level, the first flip-flop FFR1 switches the first node voltage PU1R1 from high-level to low-level.

Then at the time point T3, because the multiple-area-frame-rate control signal MAFR has been changed to low-level (controlled by the display chip 120 shown in FIG. 1), at this time, the output terminal of the first OR logic gate OR1R2 changes as a result of the first node voltage PU1R2 switching to low-level. Therefore, under the circumstance that the multiple-area-frame-rate control signal MAFR is at low-level, the first OR logic gate OR1R2 will not insulate (gate) the change of the first node voltage PU1R2, and let the second node voltage PU2R2 of the second shift register SR2 change to low-level along with the first node voltage PU1R2. As shown in FIG. 5, under this circumstance, at the time points T4 and T5, because the second node voltage PU2R1 has changed to low-level, the first gate driver signals GRST1_R2 and GRST2_R2 will generate a low-level pulse along with the fourth clock signal CK4, the second gate driver signals GDW1_R2 and GDW2_R2 will generate a low-level pulse along with the first clock signal CK1, and thus the pixel circuits PIX on the second line will refresh normally, achieving the effect of keeping (or raising) the frame rate.

For the same reason, similarly the third-stage shift register SR3 in FIG. 3 can also generate the first gate driver signals GRST1_R3 and GRST2_R3 and the second gate driver signals GDW1_R3 and GDW2_R3 correspondingly. It can be deduced that the nth-stage shift register SRn can also generate the first gate driver signals GRST1_Rn and GRST2_Rn and the second gate driver signals GDW1_Rn and GDW2_Rn correspondingly.

As illustrated in the embodiment above, each stage of the shift register SR1~SRn in the gate driver circuit 144A can share with a same control signal from the multiple-area-frame-rate control signal MAFR. The shift register SR1~SRn read the level of the multiple-area-frame-rate control signal MAFR at their respective time points, then further decide whether to insulate the first node voltages PU1R1, PU1R2, PU1R3, and PU1Rn, and whether to change the second node voltages PU2R1, PU2R2, PU2R3, and PU2Rn, achieving the effect of line-by-line frame change. Since the amount of pins and circuits required for transmission is saved by sharing the same multiple-area-frame-rate control signal MAFR, the framework area of the display panel 140 can be narrowed down, increasing the aperture ratio of the display panel 140.

In the embodiments of the present disclosure, even one of the stage of the shift registers has suspended refreshing, the shift output signals (i.e., the first node voltages PU1R1, PU1R2, and PU1R3 generated by each level) are generated normally and transmitted to the rear-stage shift registers. The subsequent stages does not be unable to receive the enable signal due to the refreshing suspension of any previous stage, thereby the bright line issue (since the node voltage has reset, but new data does not write in normally leading to a bright line) caused by the anomaly occurred at the boundary of the refreshing area and the non-refreshing area can be avoided.

It is noted that FIG. 2 is only configured to give an example of an embodiment of the pixel circuit PIX which includes seven transistors one capacitor (7T1C). In reality, the gate driver signals generated by the gate driver circuit 144A can be configured to drive the pixel circuit PIX similar to FIG. 2 or pixel circuit with other structures (such as 7T1C, 8T1C, 7T2C, 8T2C, 9T1C or other combination). The gate driver circuit 144A in the present disclosure is not limited to drive the pixel circuit PIX shown in FIG. 2.

Figure 6:
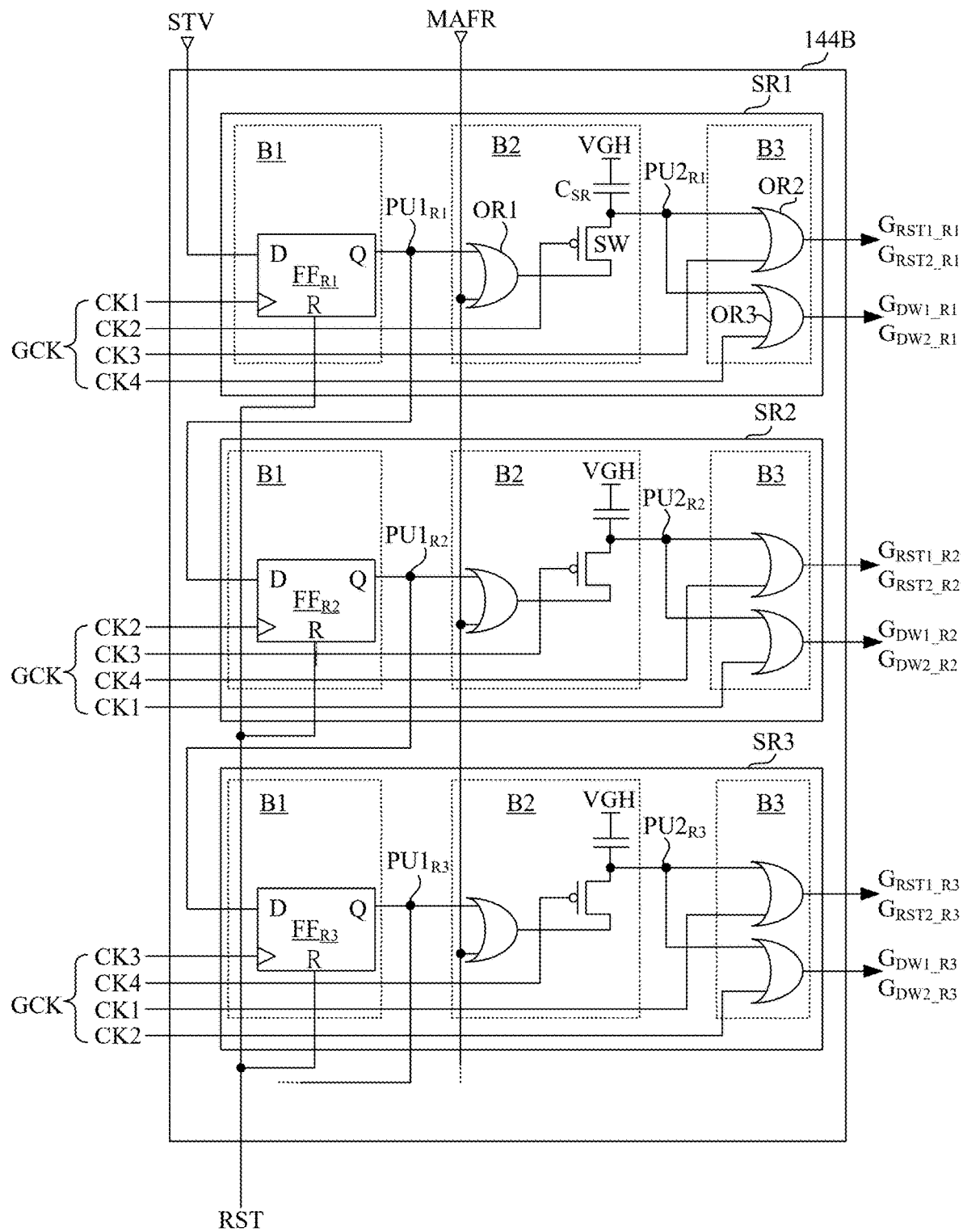
FIG. 6 is a circuit diagram illustrating an interior structure of the gate driver circuit according to another embodiment.

Referring also to FIG. 6, FIG. 6 illustrates an interior structure schematic diagram of the gate driver circuit 144B of another embodiment. The gate driver circuit 144B shown in FIG. 6 is another embodiment realizing the gate driver circuit 144 shown in FIG. 3. Compared to the embodiment of FIG. 4, the first flip-flop FFR1, the second flip-flop FFR2, and the third flip-flop FFR3 of the gate driver circuit 144B shown in FIG. 6 individually has a reset input terminal R, separately receiving a reset signal RST (can be provided by the display chip 120 shown in FIG. 1). When the reset signal RST is at low-level, the shift registers SR1~SR3 in the gate driver circuit 144B work normally. (referring to the previous embodiment in FIG. 4 and FIG. 5)

On the other hand, when the screen of the display device 100 is turned off or does not refresh the screen for a long time, the display chip 120 can switch the reset signal RST to high-level. At this time, the first flip-flop FFR1, the second flip-flop FFR2, and the third flip-flop FFR3 keep the first node voltages PU1R1, PU1R2, and PU1R3 at high-level according to the reset signal RST, and all of the pixel circuits PIX on the display panel 140 are suspended refreshing. The energy cost from the switching is lowered by suspending the change of the signals of the gate driver circuit 144B through the reset signal RST, achieving the effect of rest energy conservation.

Figure 7:
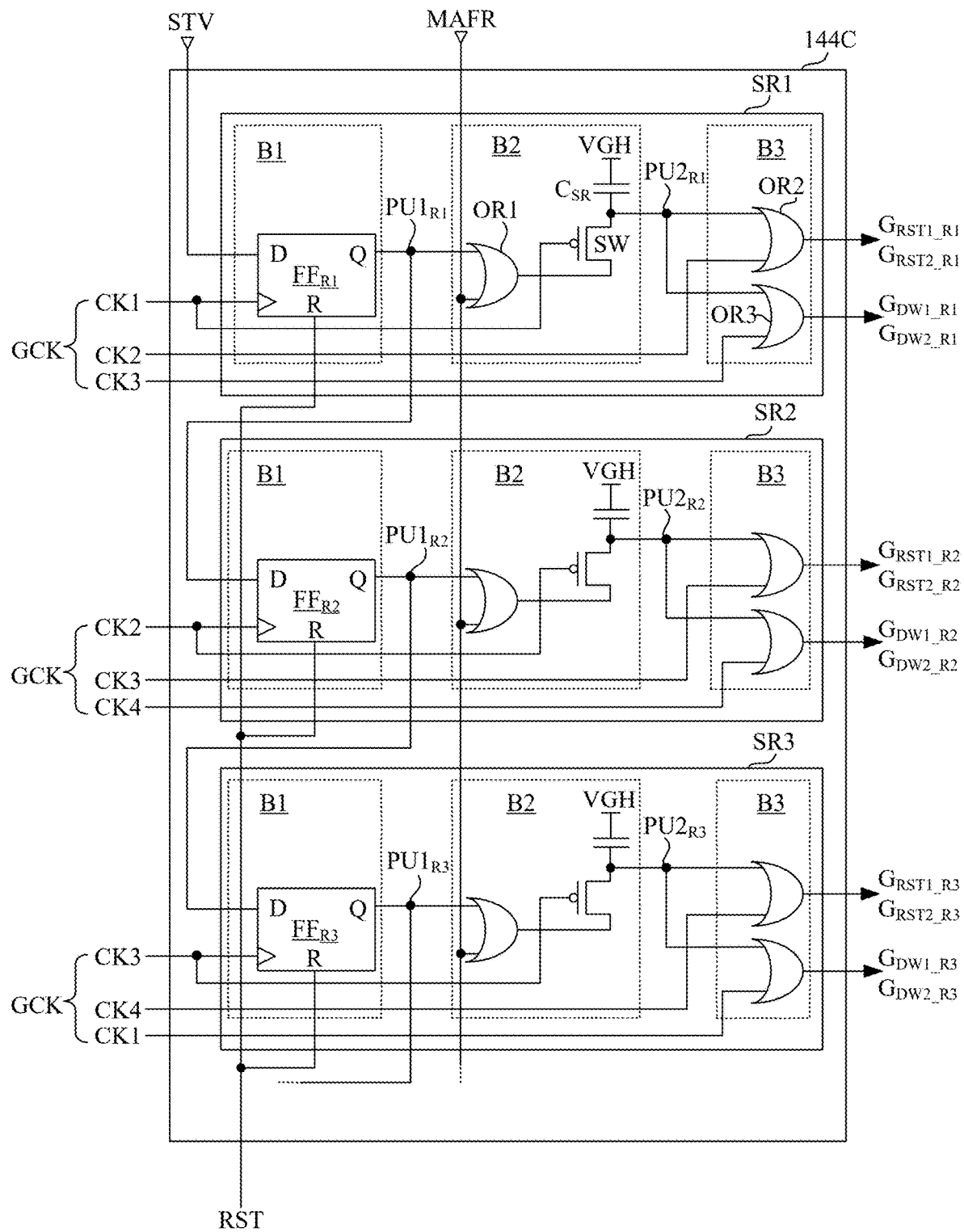
FIG. 7 is a circuit diagram illustrating an interior structure of the gate driver circuit according to one of the embodiments.
Figure 8:
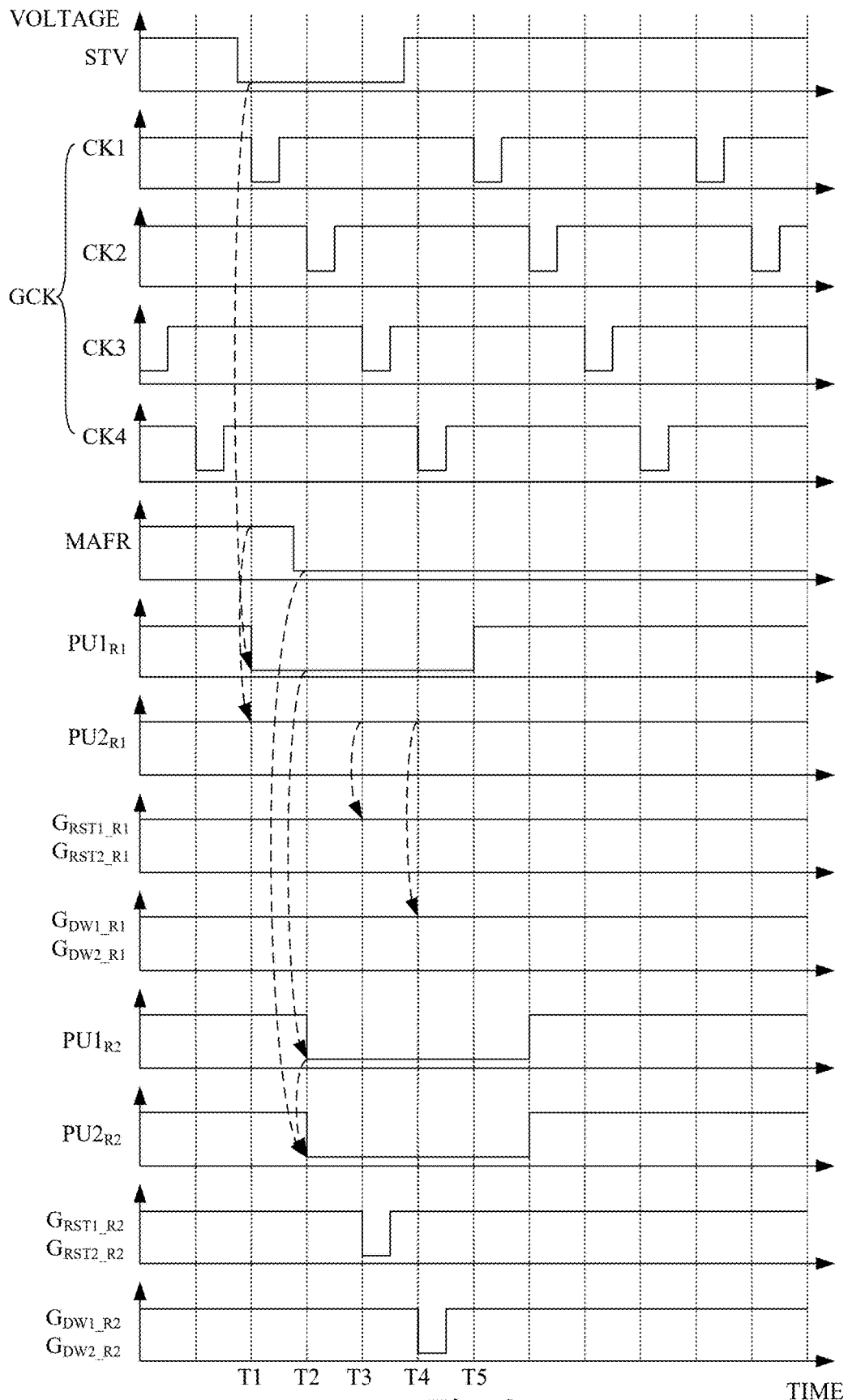
FIG. 8 is a timing waveform illustrating the signals related to the gate driver circuit change with respect to time according to the embodiment of FIG. 7.

The embodiment present in FIG. 4, each stage of the shift registers SR1~SR3 of the gate driver circuit 144A uses four phases of the clock signals CK1~CK4 to control the operation, but the disclosure is not limited to this. Referring also to FIG. 7, FIG. 7 illustrates a circuit diagram of an interior structure of a gate driver circuit 144C in one of the embodiments. FIG. 8 illustrates a timing waveform diagram of the signal voltages, which change with respect to time, related to the gate driver circuit 144C in the embodiment of FIG. 7.

The first-stage shift register SR1 of the gate driver circuit 144C in FIG. 7 uses the clock signals CK1~CK3 of three phases for controlling, the second-stage shift register SR2 uses the clock signals CK2~CK4 of three phases for controlling, and the third-stage shift register SR3 uses the clock signals CK3, CK4, and CK1 of three phases for controlling.

As shown in FIG. 7 and FIG. 8, the scan unit B1 and the control unit B2 of the first-stage shift register SR1 are controlled by the same clock signal CK1. Therefore, at the time point T1, the scan unit B1 of the first-stage shift register SR1 generates the first node voltage PU1R1, and at the same time point T1, the control unit B2 of the first-stage shift register causes the second node voltage PU2R1 unchanged due to the insulation of the multiple-area-frame-rate control signal MAFR.

As shown in FIG. 7 and FIG. 8, the scan unit B1 and the control unit B2 of the second-stage shift register SR2 are controlled by the clock signal CK2. Therefore, at the time point T2, the scan unit B1 of the second-stage shift register SR2 generates the first node voltage PU1R2, and at the same time point T2, the control unit B2 of the second-stage shift register causes the second node voltage PU2R2 change to low-level along with the first node voltage PU1R2.

For the same reason, the scan unit B1 and the control unit B2 of the third-stage shift register SR3 are controlled by the clock signal CK3. That is, each stage of the shift registers SR1~SR3 of the gate driver circuit 144C can be controlled simply by three clock signals in the embodiment presented in FIG. 7.

Figure 9:
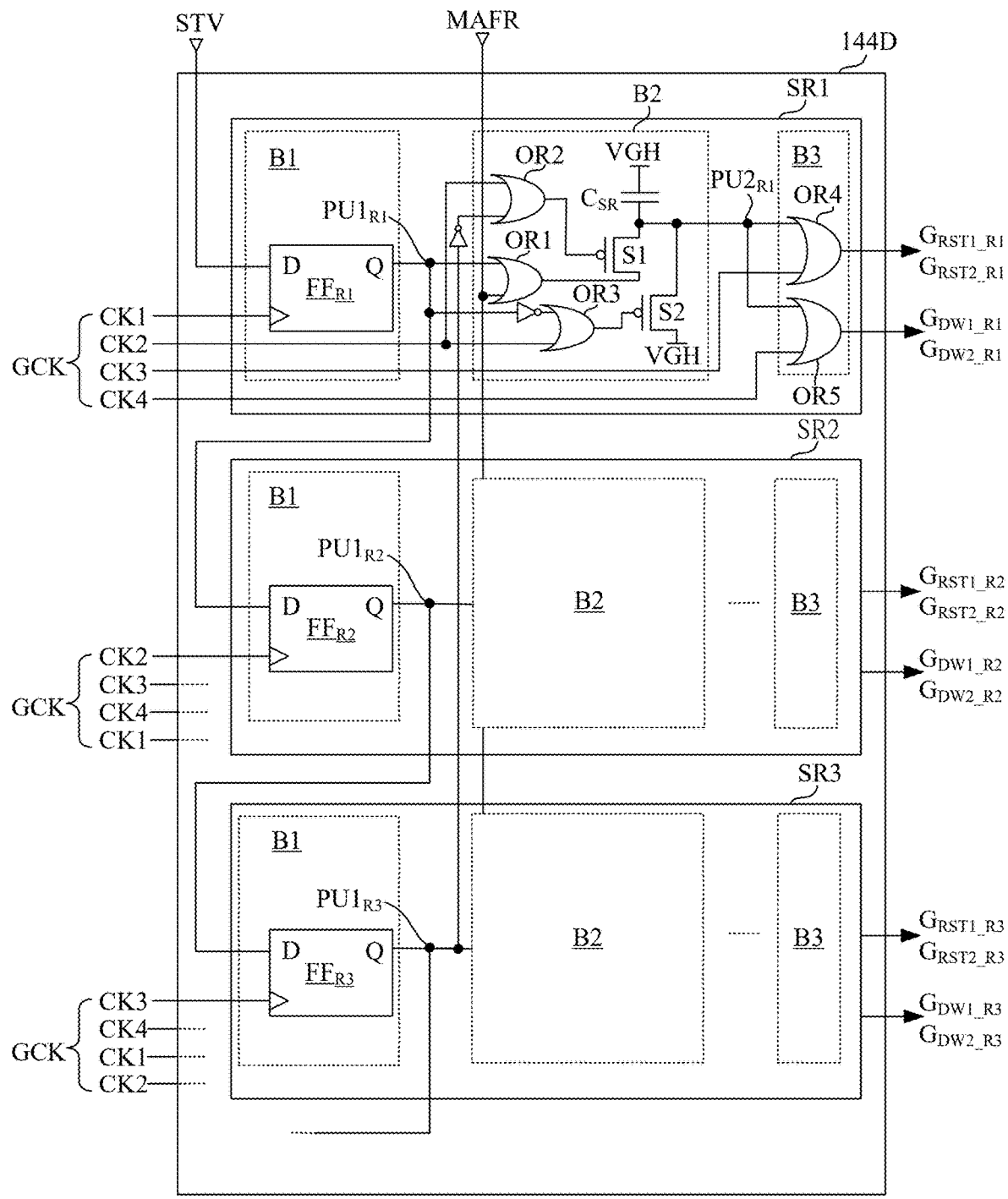
FIG. 9 is a circuit diagram illustrating an interior structure of the gate driver circuit according to one of the embodiments.
Figure 10:
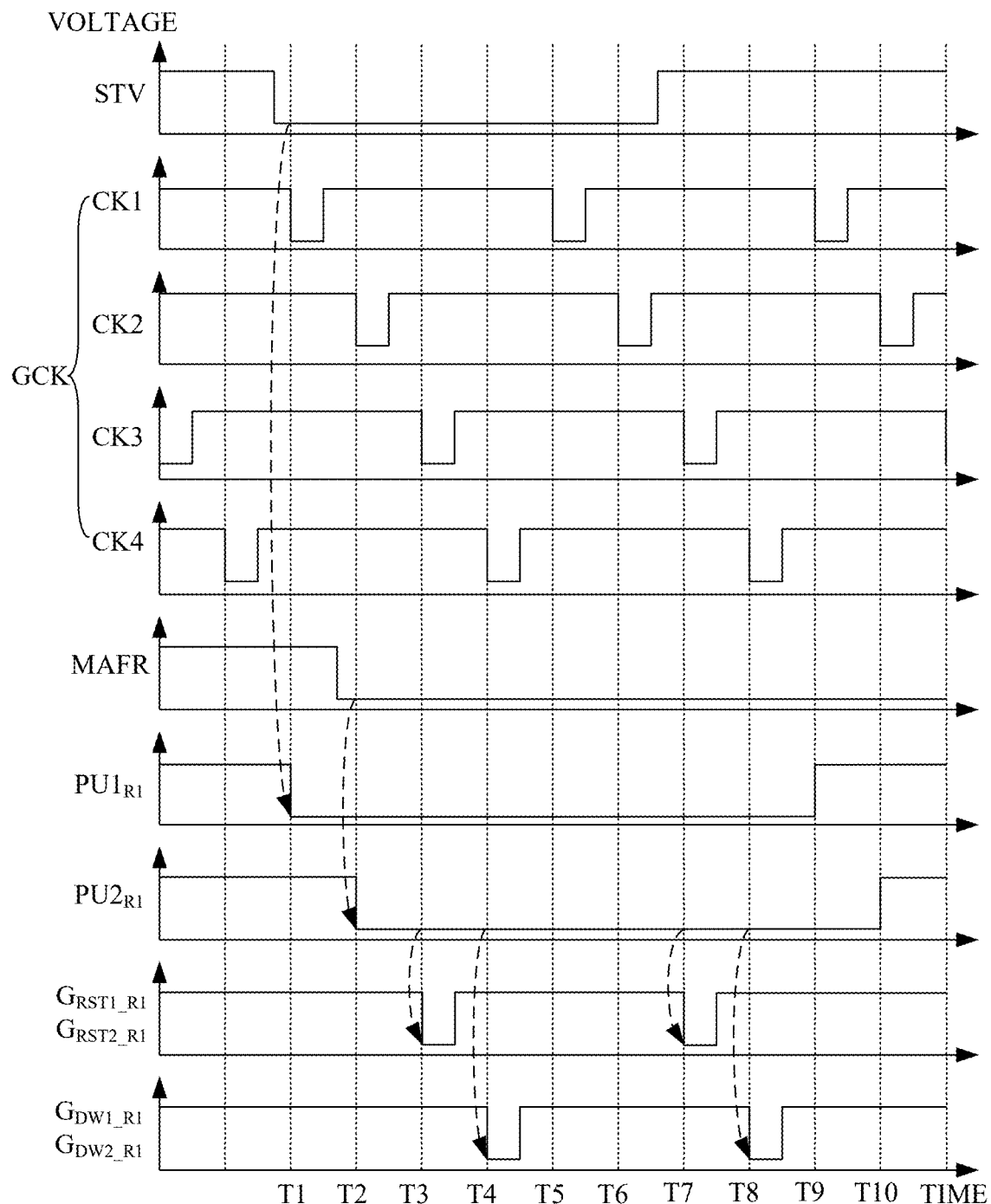
FIG. 10 is a timing waveform diagram illustrating the signals related to the gate driver circuit change with respect to time according to the embodiment of FIG. 9.

Referring also to FIG. 9, FIG. 9 illustrates a circuit diagram of an interior structure of a gate driver circuit 144D in one of the embodiments, FIG. 10 illustrates a timing waveform diagram of the signal voltages, which change with respect to time, related to the gate driver circuit 144D in the embodiment of FIG. 9. Especially be noted that the gate driver circuit 144D shown in FIG. 9 can not only achieve the feature of above mentioned multiple-area-frame-rate control but simultaneously support the repeated clock-charging feature of the scan activating signal STV.

In the embodiment presented in FIG. 9, the scan unit B1 in each stage of the shift registers SR1~SR3 of the gate driver circuit 144D is similar to the embodiment presented in FIG. 4, and thus the similarities does not repeat herein.

The control unit B2 in each stage of the shift registers SR1~SR3 of the gate driver circuit 144D is different from the previous embodiments. For simplicity, FIG. 9 illustrates an interior structure of the first-stage shift register SR1, and the rest stages of the shift registers also have the corresponding interior structure.

The control unit B2 of the first-stage shift register SR1 includes a first OR logic gate OR1, a second OR logic gate SR2, a third OR logic gate SR3, a first switch S1, a second switch S2, and a capacitor CSR.

Two input terminals of the first OR logic gate OR1 respectively receive a first node voltage PU1R1 and a multiple-area-frame-rate control signal MAFR. Two input terminals of the second OR logic gate OR2 respectively receive a second clock signal CK2 and an inverse signal of a first node voltage PU1R3 generated by the third-stage shift register SR3. Two input terminals of the third OR logic gate respectively receive the inverse signal of the first node voltage PU1R1 and a third clock signal CK3. The first terminal of the first switch S1 is coupled to the output terminal of the first OR logic gate OR1, the gate terminal of the first switch S1 is coupled to the output terminal of the second OR logic gate OR2, and the second terminal of the first switch S1 is configured to output the second node voltage PU2R1. The first terminal of the second switch S2 is coupled to a systematic high voltage VGH, the gate terminal of the second switch S2 is coupled to the output terminal of the third OR logic gate OR3, and the second terminal of the second switch S2 is coupled to the second terminal of the first switch S1. The first terminal of the capacitor CSR is coupled to the second terminal of the first switch S1 and the second terminal of the second switch S2.

The output unit B3 of the first-stage shift register SR1 includes a fourth OR logic gate OR4 and a fifth OR logic gate OR5. Two input terminals of the fourth OR logic gate respectively receive the second node voltage PU2R1 and the third clock signal CK3. The output terminal of the fourth OR logic gate OR4 is configured to output the first gate driver signals GRST1_R1 and GRST2_R1 to the first line of the pixel circuits PIX. Two input terminals of the fifth OR logic gate OR5 respectively receive the second node voltage PU2R1 and a fourth clock signal CK4, and the output terminal of the fifth OR logic gate OR5 is configured to output the second gate driver signals GDW1_R1 and GDW2_R1 to the first line of the pixel circuits PIX.

As shown in FIG. 9 and FIG. 10, the duration of the low-level which the scan activating signal STV set is extended, encompassing two negative pulses of clock signal CK1 at the time point T1 and T5. Under this circumstance, the first flip-flop FFR1 of the first-stage shift register SR1 correspondingly set the first node voltage PU1R1 to low-level from the time point T1 to the time point T9.

In the embodiment presented in FIG. 10, the multiple-area-frame-rate control signal MAFR has switched to low-level before the time point T2 is assumed, that is to say, the first node voltage PU1R1 is not insulated. At the time point T2, the second OR logic gate OR2 outputs a low-level to turned on the first switch S1, in the meantime, the first OR logic gate OR1 outputs a low-level to switch the second node voltage to the low-level.

Next, at the time points T4 and T8, the fourth OR logic gate OR4 of the output unit B3 makes the first gate driver signals GRST1_R1 and GRST2_R1 generate negative pulses twice along with the clock signal CK3. Similarly, at the time points T5 and T9, the fifth OR logic gate OR5 makes the second gate driver signals GDW1_R1 and GDW2_R1 generate negative pulses twice along with the clock signal CK4. Each voltage node of the pixel circuits PIX can thereby realize the multiple reset and multiple write charge operations.

After then, at the time point T10, the third OR logic gate OR3 outputs a low-level to turn on the second switch S2 resetting the second node voltage PU2R1 to high-level.

The paragraph mentioned above is an example that the multiple-area-frame-rate control signal MAFR has switched to low-level. If the multiple-area-frame-rate control signal MAFR keeps at high-level, the first node voltage PU1R1 can be insulated such that the second node voltage PU2R1 remains unchanged (not illustrated in FIG. 10, referring to the embodiment in FIG. 5).

As shown above, the circuit structure of the gate driver circuit 144D in the disclosure can achieve the feature of the multiple-area-frame-rate control using relatively less sets (such as single set) of the gate driver circuit and the multiple-area-frame-rate control signal MAFR with single line, and this circuit structure can simultaneously support the feature of repeated clock-charging of the scan activating signal STV avoiding the brightness/color problems caused by insufficient charging of the pixel circuits PIX.

In addition, although the embodiments presented above illustrate how to achieve the change of frame rates at different area on the display panel by the multiple-area-frame-rate control signal MAFR, the similar design can be also applied to the issue of the display image error on the display panel affected by an exterior intervention. For example, the multiple-area-frame-rate control signal MAFR is connected to an anomaly detection circuit, the anomaly detection circuit is configured to detect whether the display panel is being affected, such as when an abnormal EMI intervention occurs, the refresh of the display panel is suspended, by the mechanism of the invention disclosed, to avoid the error arises at the image refreshing. In another embodiment, the multiple-area-frame-rate control signal MAFR can simultaneously connect to an anomaly detection circuit and the display chip, so as to operate the multiple-area-frame-rate control or suspend refreshing when anomalies occur, which is achieved by the mechanism of the invention disclosed. In the other embodiment, the multiple-area-frame-rate control signal MAFR does not utilize to operate the multiple-area-frame-rate control, but connect to an image qualification circuit. When a frame of a received image is determined as low quality by image qualification circuit, the aforementioned mechanism is utilized to skip refreshing the image of the frame.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A gate driver circuit comprising:
a plurality stages of shift registers, cascade connected in series, each of the plurality stages of shift registers comprising:
   a scan unit configured to receive an enable signal, the scan unit sampling the enable signal according to a clock to output a first node voltage, the first node voltage is utilized as a shift output signal transmitted to a following shift register;
   a control unit configured to receive a multiple-area-frame-rate control signal, the control unit configured to output a second node voltage according to the first node voltage when the multiple-area-frame-rate control signal is at a first level, the control unit configured to insulate the first node voltage and causing the second node voltage remaining unchanged when the multiple-area-frame-rate control signal is at a second level; and
   an output unit configured to receive the second node voltage, the output unit selectively transmitting or suspended transmitting a plurality of gate driver signals to a pixel circuit on a display panel according to the second node voltage.

2. The gate driver circuit of claim 1, wherein the plurality stages of shift registers includes a first-stage shift register, the scan unit of the first-stage shift register comprising:
a first flip-flop, a data input terminal of the first flip-flop receiving the enable signal the enable signal being a scan activating signal, a clock input terminal of the flip-flop receiving a first clock signal, and the first flip-flop triggered by an edge of the first clock signal to sample a level of the enable signal and generate the first node voltage at an data output terminal of the first flip-flop.

3. The gate driver circuit of claim 2, wherein the control unit of the first-stage shift register comprising:
a first OR logic gate, two input terminals of the first OR logic gate respectively receiving the first node voltage and the multiple-area-frame-rate control signal;
a switch, a first terminal of the switch being coupled to an output terminal of the first OR logic gate, a gate terminal of the switch receiving a second clock signal, a second terminal of the switch configured to output the second node voltage, and a phase of the second clock signal lagging behind the first clock signal; and
a capacitor, a first terminal of the capacitor being coupled to the second terminal of the switch, configured to store the second node voltage.

4. The gate driver circuit of claim 3, wherein the output unit of the first-stage shift register comprising:
a second OR logic gate, two input terminals of the second OR logic gate respectively receiving the second node voltage and a third clock signal, an output terminal of the second OR logic gate configured to output a first gate driver signal to the pixel circuit, and a phase of the third clock signal lagging behind the second clock signal; and
a third OR logic gate, two input terminals of the third OR logic gate respectively receiving the second node voltage and a fourth clock signal, an output terminal of the third OR logic gate configured to output a second gate driver signal to the pixel circuit, and a phase of the fourth clock signal lagging behind the third clock signal.

5. The gate driver circuit of claim 2, wherein the control unit of the first-stage shift register comprising:
a first OR logic gate, two input terminals of the first OR logic gate respectively receiving the first node voltage and the multiple-area-frame-rate control signal;
a switch, a first terminal of the switch being coupled to an output terminal of the first OR logic gate, a gate terminal of the switch receiving a first clock signal, and a second terminal of the switch configured to output the second node voltage; and
a capacitor, a first terminal of the capacitor being coupled to the second terminal of the switch configured to store the second node voltage.

6. The gate driver circuit of claim 5, wherein the output unit of the first-stage shift register comprising:
a second OR logic gate, two input terminals of the second OR logic gate respectively receiving the second node voltage and a second clock signal, an output terminal of the second OR logic gate configured to output a first gate driver signal to the pixel circuit, and the phase of the second clock signal lagging behind the first clock signal; and
a third OR logic gate, two output terminals of the third OR logic gate respectively receiving the second node voltage and a third clock signal, an output terminal of the third OR logic gate configured to output a second gate driver signal to the pixel circuit, and the phase of the third clock signal lagging behind the second clock signal.

7. The gate driver circuit of claim 2, wherein a reset input terminal of the first flip-flop receives a reset signal, the first flip-flop keeping the first node voltage to high-level when the reset signal is at high-level, and the first flip-flop keeping the first node voltage to low-level when the reset signal is at low-level.

8. The gate driver circuit of claim 2, wherein the plurality stages of shift registers further includes a second-level shift register, the scan unit of the second-stage shift register comprising:
a second flip-flop, a data input terminal of the second flip-flop receiving the enable signal, the enable signal being the shift output signal that comes from the first-stage shift register, a clock input terminal of the second flip-flop receiving a second clock signal, and the second flip-flop triggered by an edge of the clock signal to sample a level of the enable signal and generate the first node voltage at the data output terminal of the second flip-flop.

9. The gate driver circuit of claim 2, wherein the control unit of the first-stage shift register comprising:
a first OR logic gate, two input terminals of the first OR logic gate respectively receiving the first node voltage and the multiple-area-frame-rate control signal;
a second OR logic gate, two output terminals of the second OR logic gate respectively receiving a second clock signal and another first node voltage generated by a rear-stage shift register;
a third OR logic gate, two input terminals of the third OR logic gate respectively receiving the first node voltage and a third clock signal;
a first switch, a first terminal of the first switch being coupled to an output terminal of the first OR logic gate, a gate terminal of the first switch being coupled to an output terminal of the second OR logic gate, and a second terminal of the first switch configured to output the second node voltage;
a second switch, a first terminal of the second switch being coupled to a systematic high-voltage, a gate terminal of the second switch being coupled to an output terminal of the third OR logic gate, and a second terminal of the second switch being coupled to the second terminal of the first switch; and
a capacitor, a first terminal of the capacitor being coupled to the second terminal of the first switch and the second terminal of the second switch.

10. The gate driver circuit of claim 9, wherein the output unit of the first-stage shift register comprising:
a fourth OR logic gate, two output terminals of the fourth OR logic gate respectively receiving the second node voltage and a third clock signal, an output terminal of the fourth OR logic gate configured to output a first gate driver signal to the pixel circuit, and the phase of the third clock signal lagging behind the second clock signal; and
a fifth OR logic gate, two input terminals of the fifth OR logic gate respectively receiving the second node voltage and a fourth clock signal, an output terminal of the fifth OR logic gate configured to output a second gate driver signal to the pixel circuit, and the phase of the fourth clock signal lagging behind the third clock signal.

11. A display device, comprising:
a display chip configured to generate a scan control signal; and
a display panel coupled to the display chip, the display panel including an active area and a gate driver circuit, the gate driver circuit configured to generate a plurality of the gate driver signals to the active area according to the scan control signal provided by the display chip, the gate driver circuit including a plurality stages of shift registers, the plurality stages of shift registers cascade connected in series, and each of the shift register respectively comprising:
a scan unit configured to receive an enable signal, the scan unit sampling the enable signal according to a clock to output a first node voltage, the first node voltage is utilized as a shift output signal transmitted to a following shift register;
a control unit configured to receive a multiple-area-frame-rate control signal, the control unit configured to output a second node voltage according to the first node voltage when the multiple-area-frame-rate control signal is at a first level, the control unit configured to insulate the first node voltage and causing the second node voltage remaining unchanged when the multiple-area-frame-rate control signal is at a second level; and
an output unit configured to receive the second node voltage, the output unit selectively transmitting or suspended transmitting a plurality of gate driver signals to a pixel circuit on a display panel according to the second node voltage.

12. The display device of claim 11, wherein the plurality stages of shift registers includes a first-stage shift register, and the scan unit of the first-stage shift register comprising:
a first flip-flop, a data input terminal of the first flip-flop receiving the enable signal the enable signal being a scan activating signal, a clock input terminal of the flip-flop receiving a first clock signal, and the first flip-flop triggered by an edge of the first clock signal to sample a level of the enable signal and generate the first node voltage at an data output terminal of the first flip-flop.

13. The display device of claim 12, wherein the control unit of the first-stage shift register comprising:
a first OR logic gate, two input terminals of the first OR logic gate respectively receiving the first node voltage and the multiple-area-frame-rate control signal;
a switch, a first terminal of the switch being coupled to an output terminal of the first OR logic gate, a gate terminal of the switch receiving a second clock signal, a second terminal of the switch configured to output the second node voltage, and a phase of the second clock signal lagging behind the first clock signal; and
a capacitor, a first terminal of the capacitor being coupled to the second terminal of the switch, configured to store the second node voltage.

14. The display device of claim 13, wherein the output unit of the first-stage shift register comprising:
a second OR logic gate, two input terminals of the second OR logic gate respectively receiving the second node voltage and a third clock signal, an output terminal of the second OR logic gate configured to output a first gate driver signal to the pixel circuit, and a phase of the third clock signal lagging behind the second clock signal; and
a third OR logic gate, two input terminals of the third OR logic gate respectively receiving the second node voltage and a fourth clock signal, an output terminal of the third OR logic gate configured to output a second gate driver signal to the pixel circuit, and a phase of the fourth clock signal lagging behind the third clock signal.

15. The display device of claim 12, wherein the control unit of the first-stage shift register comprising:

a first OR logic gate, two input terminals of the first OR logic gate respectively receiving the first node voltage and the multiple-area-frame-rate control signal;

a switch, a first terminal of the switch being coupled to an output terminal of the first OR logic gate, a gate terminal of the switch receiving a first clock signal, and a second terminal of the switch configured to output the second node voltage; and a capacitor, a first terminal of the capacitor being coupled to the second terminal of the switch configured to store the second node voltage.

16. The display device of claim 15, wherein the output unit of the first-stage shift register comprising:

a second OR logic gate, two input terminals of the second OR logic gate respectively receiving the second node voltage and a second clock signal, an output terminal of the second OR logic gate configured to output a first gate driver signal to the pixel circuit, and the phase of the second clock signal lagging behind the first clock signal; and a third OR logic gate, two output terminals of the third OR logic gate respectively receiving the second node voltage and a third clock signal, an output terminal of the third OR logic gate configured to output a second gate driver signal to the pixel circuit, and the phase of the third clock signal lagging behind the second clock signal.

17. The display device of claim 12, wherein a reset input terminal of the first flip-flop receives a reset signal, the first flip-flop keeping the first node voltage to high-level when the reset signal is at high-level, and the first flip-flop keeping the first node voltage to low-level when the reset signal is at low-level.

18. The display device of claim 12, wherein the plurality stages of shift registers further includes a second-level shift register, the scan unit of the second-stage shift register comprising:

a second flip-flop, a data input terminal of the second flip-flop receiving the enable signal, the enable signal being the shift output signal that comes from the first-stage shift register, a clock input terminal of the second flip-flop receiving a second clock signal, and the second flip-flop triggered by an edge of the clock signal to sample a level of the enable signal and generate the first node voltage at the data output terminal of the second flip-flop.

19. The display device of claim 12, wherein the control unit of the first-stage shift register comprising:

a first OR logic gate, two input terminals of the first OR logic gate respectively receiving the first node voltage and the multiple-area-frame-rate control signal;

a second OR logic gate, two output terminals of the second OR logic gate respectively receiving a second clock signal and another first node voltage generated by a rear-stage shift register;

a third OR logic gate, two input terminals of the third OR logic gate respectively receiving the first node voltage and a third clock signal;

a first switch, a first terminal of the first switch being coupled to an output terminal of the first OR logic gate, a gate terminal of the first switch being coupled to an output terminal of the second OR logic gate, and a second terminal of the first switch configured to output the second node voltage;

a second switch, a first terminal of the second switch being coupled to a systematic high-voltage, a gate terminal of the second switch being coupled to an output terminal of the third OR logic gate, and a second terminal of the second switch being coupled to the second terminal of the first switch; and a capacitor, a first terminal of the capacitor being coupled to the second terminal of the first switch and the second terminal of the second switch.

20. The display device of claim 19, wherein the output unit of the first-stage shift register comprising:

a fourth OR logic gate, two output terminals of the fourth OR logic gate respectively receiving the second node voltage and a third clock signal, an output terminal of the fourth OR logic gate configured to output a first gate driver signal to the pixel circuit, and the phase of the third clock signal lagging behind the second clock signal; and a fifth OR logic gate, two input terminals of the fifth OR logic gate respectively receiving the second node voltage and a fourth clock signal, an output terminal of the fifth OR logic gate configured to output a second gate driver signal to the pixel circuit, and the phase of the fourth clock signal lagging behind the third clock signal.

* * * * *